Aug. 6, 1929.  J. BARWICKI  1,723,121
RAT TRAP
Filed Feb. 25, 1928  2 Sheets-Sheet 1

INVENTOR
John Barwicki
BY
Zoltan H Polachek
ATTORNEY

Aug. 6, 1929. J. BARWICKI 1,723,121
RAT TRAP
Filed Feb. 25, 1928 2 Sheets-Sheet 2

INVENTOR
John Barwicki
BY
ATTORNEY

Patented Aug. 6, 1929.

1,723,121

UNITED STATES PATENT OFFICE.

JOHN BARWICKI, OF NEW YORK, N. Y.

RAT TRAP.

Application filed February 25, 1928. Serial No. 256,825.

This invention relates to subject matter similar to that disclosed in my Patent Number 1,440,901, dated January 2, 1923, for a rat trap.

My present invention relates to a new and useful device in the nature of a trap especially adapted for the purpose of catching mice or rats.

The invention has for an object the provision of an improved novel trap of the type in which the rodent is projected into an enclosure and electrocuted by means of a device released by the rodent pulling on a bait hook.

A further object of the invention is to provide a rat trap of the class described of new and novel construction, positive in action hereinafter more fully described, claimed and illustrated in the accompanying drawing.

Figure 1:
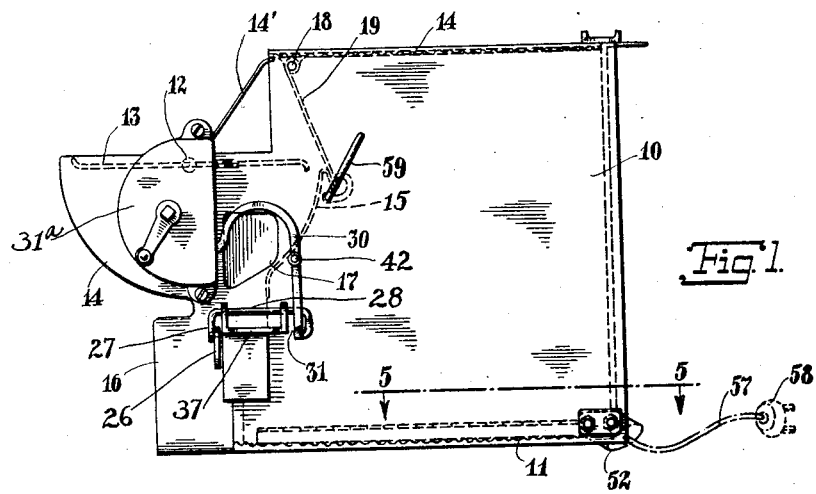
Fig. 1 is a side elevational view of my improved rat trap.
Figures 2, 5:
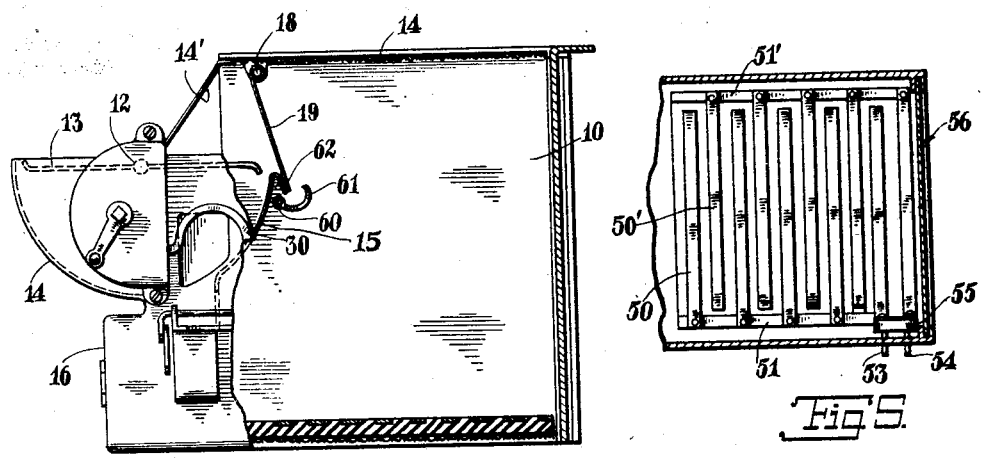
Fig. 2 is a similar view partly in section so as to more clearly show the interior construction of my improved device.
Fig. 5 is a sectional view taken on the line 5—5 of Fig. 1.
Figure 3:
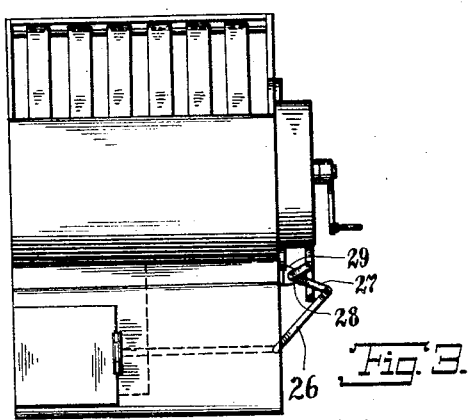
Fig. 3 is a front elevational view thereof.
Figure 4:
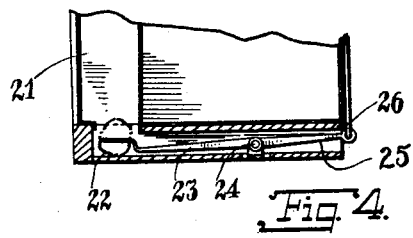
Fig. 4 is a fragmentary vertical sectional view showing the bait lever.
Figure 6:
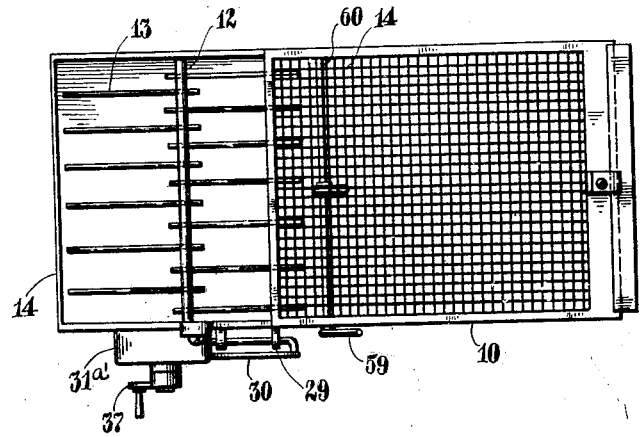
Fig. 6 is a plan view of the trap.
Figure 7:
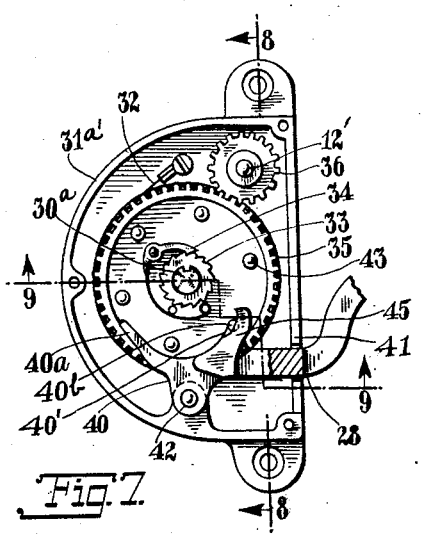
Fig. 7 is a detail face view of the operating mechanism for the rotary element.
Figure 8:
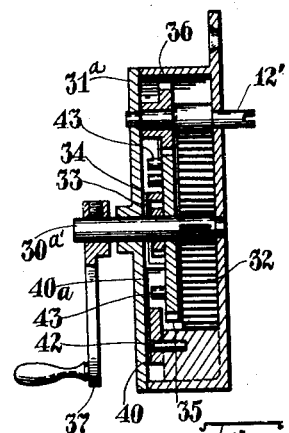
Fig. 8 is a sectional view taken on the line 8—8 of Fig. 7.

As here embodied my improved rat trap comprises a housing or cage 10 which is mounted on a base 11. The top of the cage 10 is comprised partly of the rotary element consisting of a transverse shaft 12 from which the spaced rods 13 project, and partly by the screen 14. The former normally occupying a horizontal position closing the top of the forward portion of the cage 10. A plurality of rods 14' are secured at their upper extremities to the forward edge of the screen 14, and extend angularly downwardly therefrom. The front wall 14 of the cage is curved concentric with the shaft 12 which is journaled in the said front wall 14. Extending across and within the cage 10, between the sides thereof, is a partition 15, which is secured at its lower edge to the enlarged portion 16 of the base 10, and its upper edge is positioned below the rear sides of the rotary element, this partition is also curved concentric with the shaft 12, and forms with the front wall of the cage a chamber into which the rodent enters. The entrance to this chamber is through an opening 17 formed in one of the side walls of the cage 10. Extending across the cage 10 above the rear edge of the partition 15 is a trap door 19, which is hinged at its upper edge as at 18, and has its lower edge resting against the top edge of the partition.

Formed in the enlarged portion 16 of the base 10, near the opposite wall of the cage to that in which is the opening 17, is a recess 21 in which the bait designated by the reference numeral 22 is located. The bait is placed on the inner end of a lever 23 fulcrumed intermediately as at 24 in a transverse slot 25 formed in the base. The outer end of this lever projects from the enlarged portion 16 of the base and has attached thereto the lower end of a link 26 which extends upwardly outside the cage and is connected at its upper end to an arm 27 secured to the shaft 28 rotatively carried in the bracket 29 secured to the cage 10. The link 30 controlling the operation of a power mechanism for rotating the element 12 and 13 is connected to the arm 31 secured to the shaft 28.

This power means comprises a stub shaft $30^a$ journaled in a casing $31^a$ fixed to the side of the cage and having connected thereto one end of a clock spring 32 whose other end is attached to the casing $31^a$. Fixed on the shaft $30^a$ is a ratchet wheel 33 engaged by a spring pressed pawl 34 carried on a gear 35, loose on the stub shaft $30^a$ and meshing with a pinion 36 fixed on a stub extension 12' of the shaft 12 of the rotary element. To wind the spring 32 a handle 37 is provided adapted to removably engage on the extremity of the shaft $30^a$.

In connection with this mechanism an escapement device is provided which permits of only one-half turn or revolution of the rotary element each time the bait is pulled, this escapement device comprises a bell shaped element 40 from which the arm 28 projects rigidly through the slot 41 in the casing 31. This element is pivoted as at 42 on the casing and is adapted for reciprocal engagement with a series of pins 43 fixed to the gear 35.

One arm 40' of this bell crank 40 is formed with an abutment shoulder 45 to receive the pins 43 successively and hold the gear against rotation. The other arm 40ᵃ acts as a cam to be engaged by one pin to move the shoulder 45 into the path of the following pin. As one pin rides off the arm 40ᵃ another pin rides behind the end of arm 40' and onto the shoulder 45, a notch 40ᵇ is cut in the arm 40' adjacent said shoulder, through which the pin passes from the shoulder when the lever 23 is actuated.

As a means of killing the rodent after it has been deposited in the compartment at the rear of the trap I have provided in the top face of the base 10 a plurality of suitably insulated contact bars 50, connected to and transversely extended from the connecting bar 51, and a plurality of similar contact bars 50', positioned intermediate the bars 50, and connected to a similar connecting bar 51' positioned opposite the said bar 51. The electrical switch plug 52, is adapted to removably engage the contact points 53 and 54, mounted in a suitable insulation block 55 and extended outside the cage. The contact points 53 and 54 are suitably connected to the connecting bar 51 and to the bar 56 connected to the connecting bar 51'. The plug 52 is connected to the wire 57, which has secured thereto at its extremity a plug socket 58 adapted to engage the usual electrical socket as a means of connecting to any suitable electric current.

The lever 59 is positioned outside the cage 10 and is connected at its upper extremity to the rod 60 extended somewhat below the rear edge of the partition 15, and is rotatively mounted in the walls of the cage 10. The rod 60 is provided with an intermediate hook shaped element 61 adapted to engage the lower edge of the trap door 19 and the lip 62 of the partition 15, as a means of securely holding the trap door 19 in a closed position so as to prevent the escape of the rodents from my improved trap.

Figures 9, 10, 11:
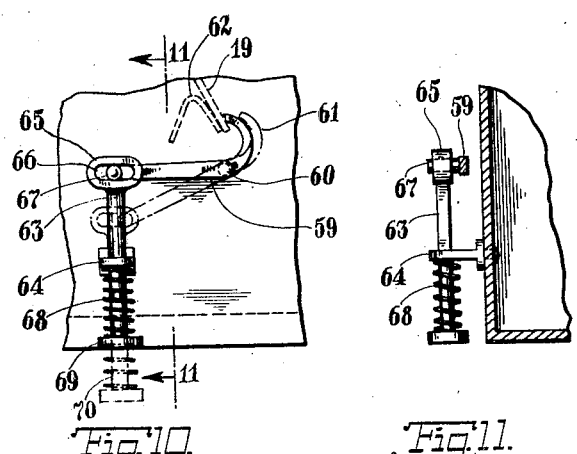
Fig. 9 is a sectional view taken on the line 9—9 of Fig. 7.
Fig. 10 is a fragmentary side elevational view showing an automatic locking arrangement for the trap door.
Fig. 11 is a fragmentary vertical sectional view taken on the line 11—11 of Fig. 10.

In Figs. 10 and 11 of the accompanying drawing, I have shown a rod 63 slidably mounted in the support 64, secured to and extended outside the cage 10. The upper enlarged extremity 65 of the support 64 has formed therein an elongated opening 66 adapted to receive the extended portion 67 of the above mentioned lever 59. The expansion spring 68 is co-axial on the rod 63 and is positioned intermediate the support 64 and the enlarged lower extremity 69 of the rod 63. The above mentioned construction is such as will hold the element 61 of the above mentioned rod 60 out of engagement with the trap door 19 and the lip 62 of the partition 15, when my improved cage is placed on the floor or on the ground, and which permits the spring 68 to downwardly extend the rod 63, as designated by dotted lines 70 in Fig. 10, as a means of engaging the element 61 of the rod 60 with the trap door 19 and the lip 62 of the partition 15, when the trap is lifted off the floor, for preventing the escape of the rodents from my improved cage.

Having thus described my invention what I claim as new and desire to secure by United States Letters Patent is:

1. In a rat trap of the class described, a trap door pivotally mounted on its upper edge on the cage of a trap, and having its lower edge disposed against the top edge of a partition within the trap, a rod pivotally mounted, having a hook end engageable against the bottom of the trap door for holding it closed, a support attached to the cage of the trap, a second rod slidably mounted thereon, and having an elongated opening receiving the plain end of the said first rod, and movable so that its lower end projects beneath the bottom of the trap, and a spring for urging the second rod downwards for moving the hook of the first rod into operative position when the trap is lifted from the floor so as to allow the lower end of the second rod to move below the bottom of the trap.

2. In a rat trap of the class described, a trap door pivotally mounted on its upper edge on the cage of a trap, and having its lower edge disposed against the top edge of a partition within the trap, a rod pivotally mounted, having a hook end engageable against the bottom of the trap door for holding it closed, a support attached to the cage of the trap, a second rod slidably mounted thereon, and having an elongated opening receiving the plain end of the said first rod, and movable so that its lower end projects beneath the bottom of the trap, and means for urging the second rod downwards for moving the hook of the first rod into operative position when the trap is lifted from the floor so as to allow the lower end of the second rod to move below the bottom of the trap.

3. In a rat trap of the class described, a trap door pivotally mounted on its upper edge on the cage of a trap, and having its lower edge disposed against the top edge of a partition within the trap, a rod pivotally mounted, having a hook end engageable against the bottom of the trap door for holding it closed, a support attached to the cage of the trap, a second rod slidably mounted thereon, and arranged for pivotally and slidably connecting with the plain end of the said first rod, and movable so that its lower end projects beneath the bottom of the trap, and a spring for urging the second rod downwards for moving the hook of the first rod into operative position when the trap is lifted from the floor so as to allow the lower end of the second rod to move below the bottom of the trap.

In testimony whereof I have affixed my signature.

JOHN BARWICKI.